(12) United States Patent
Kurras et al.

(10) Patent No.: US 10,687,303 B2
(45) Date of Patent: Jun. 16, 2020

(54) USER EQUIPMENT LOCALIZATION IN A MOBILE COMMUNICATION NETWORK BASED ON DELAYS AND PATH STRENGTHS

(71) Applicant: Fraunhofer-Gesellschaft zur Foerderung der angewandten Forschung e.V., Munich (DE)

(72) Inventors: Martin Kurras, Berlin (DE); Markus Landmann, Zeitz (DE); Marcus Grossmann, Friedrichroda (DE); Sutharshun Varatharaajan, Ilmenau (DE); Niels Hadaschik, Munich (DE); Lars Thiele, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/409,346

(22) Filed: May 10, 2019

(65) Prior Publication Data
US 2019/0373575 A1    Dec. 5, 2019

Related U.S. Application Data

(63) Continuation of application No. PCT/EP2017/078870, filed on Nov. 10, 2017.

(30) Foreign Application Priority Data

Nov. 11, 2016    (EP) ..................... 16198389

(51) Int. Cl.
*H04W 64/00* (2009.01)
*H04W 4/029* (2018.01)
(Continued)

(52) U.S. Cl.
CPC ............. *H04W 64/006* (2013.01); *G01S 5/10* (2013.01); *G01S 11/06* (2013.01); *H04L 5/005* (2013.01);
(Continued)

(58) Field of Classification Search
CPC ..................................................... H04W 64/006
(Continued)

(56) References Cited

U.S. PATENT DOCUMENTS

| 2004/0072579 A1 | 4/2004 | Hottinen |
| 2015/0011238 A1 | 1/2015 | Tujkovic |

FOREIGN PATENT DOCUMENTS

WO    2015145217 A1    10/2015

OTHER PUBLICATIONS

"Radiation pattern", Wikipedia, Retrieved on Oct. 12, 2019.
(Continued)

*Primary Examiner* — Joel Ajayi
(74) *Attorney, Agent, or Firm* — Michael A. Glenn; Perkins Coie LLP (57) ABSTRACT

A receiver has a plurality of antennas and receives a plurality of radio signals from a plurality of transmitters of different cells of a wireless communication network. Each radio signal has a position reference signal sequence and is transmitted to the receiver via a radio channel including a plurality of path components. The receiver processes the radio signal to estimate for a path component the time of arrival of the PRS sequence and to determine for a path component a path strength value of the PRS sequence. A position of the receiver is estimated using the ToAs and the PS values.

21 Claims, 8 Drawing Sheets

(51) Int. Cl.
  *G01S 5/10*   (2006.01)
  *G01S 11/06*  (2006.01)
  *H04L 5/00*   (2006.01)
  *H04L 27/26*  (2006.01)

(52) U.S. Cl.
  CPC ......... *H04L 27/2634* (2013.01); *H04W 4/029* (2018.02)

(58) Field of Classification Search
  USPC ....................................................... 455/456.1
  See application file for complete search history.

(56) References Cited

OTHER PUBLICATIONS

"Study on indoor positioning enhancements for UTRA and LTE (Release 13)", 3GPP TR 37.857 V13.1.0, 3rd Generation Partnership Project, Technical Specification Group Radio Access Network, Dec. 2015.

"LTE Positioning Protocol (LPP) (Release 13)", 3GPP TS 36.355 V13.1.0, 3rd Generation Partnership Project, Technical Specification Group Radio Access Network, Evolved Universal Terrestrial Radio Access (E-UTRA), Mar. 2016.

"LTE Positioning Protocol A (LPPa) (Release 13)", 3GPP TS 36.455 V13.1.0, 3rd Generation Partnership Project, Technical Specification Group Radio Access Network, Evolved Universal Terrestrial Radio Access (E-UTRA), Mar. 2016.

Sven Fischer, "Observed Time Difference of Arrival (OTDOA) Positioning in 3GPP LTE", Qualcomm White Pap, vol. 1, pp. 1-62, Jun. 6, 2014.

Mike Thorpe, et al., "LTE Location Based Services Technology Introduction", Rhode & Schwarz, Sep. 2013.

Marilynn P. Wylie-Green, et al.,"Robust Range Estimation in the Presence of the Non-Line-of-Sight Error," in Proc. IEEE Vehicular Technology Conference, vol. 1, pp. 101-105, Fall 2001.

S. Venkatraman, et al., "Location Using LOS Range Estimation in NLOS Environments," in Proc. IEEE Vehicular Technology Conference, vol. 2, pp. 856-860, Spring 2002.

Li Xiong, "A Selective Model to Suppress NLOS Signals in Angle-of-Arrival (AOA) Location Estimation," in Proc. IEEE Int. Symp. Pers., Indoor, Mobile Radio Commun., Boston, MA, Sep. 8-11, 1998, vol. 1, pp. 461-465.

S. Al-Jazzar, et al., "A Scattering Model Based Approach to NLOS Mitigation in TOA Location Systems," in Proc. IEEE Veh. Technol. Conf., Birmingham, AL, May 6-9, 2002, vol. 2, pp. 861-865.

Yiu-Tong Chan, et al., "Time-of-Anival Based Localization under NLOS Conditions," IEEE Transactions on Vehicular Technology, Jan. 2006, vol. 55, pp. 17-24.

Honglei Miao, "Positioning for NLOS Propagation: Algorithm Derivations and Cramer-Rao Bounds," IEEE Trans. Veh. Technol., vol. 56, No. 5, pp. 2568-2580, 2007.

Konstantinos Papakonstantinou, et al., "NLOS Mobile Terminal Position and Speed Estimation," Communications, Control and Signal Processing, 2008. ISCCSP 2008. 3rd International Symp., pp. 1308-1313, Mar. 2008.

Ericsson, "Positioning with LTE, maximizing performance through integrated solutions", Sep. 2011, pp. 1-12.

ETSI, "ETSI TS 136 455, Evolved Universal Terrestrial Radio Access (E-UTRA) LTE Positioning protocol; 3GPP TS 36.455 version 13.1. Release 13", May 2016, pp. 1-64.

Narek Rostomyan, et al., "A Balanced Impulse Radiating Omnidirectional Ultrawideband Stacked Biconical Antenna", IEEE Transactions on Antennas and Propagation, vol. 63, No. 1, Jan. 1, 2015, pp. 59-68.

Yang Miao, et al., "Antenna De-Embedding of Radio Propagation Channel With Truncated Modes in the Spherical Vector Wave Domain", IEEE Transactions on Antennas and Propagation, IEEE Service Center, Piscataway, NJ, US, vol. 63, No. 9, Sep. 1, 2015 (Sep. 1, 2015), pp. 4100-4110, XP011667837.

Pi-Chun Chen, "A Non-Line-of-Sight Error Mitigation Algorithm in Location Estimation," in Proc. IEEE Wireless Commun. Netw. Conf., New Orleans, LA, Sep. 21-24, 1999, vol. 1, pp. 316-320.

Li Gong, et al., "Non-Line-of-Sight Error Mitigation in TDOA Mobile Location," in Proc. IEEE Global Telecommun. Conf., San Antonio, TX, Nov. 25-29, 2001, vol. 1, pp. 680-684.

Saipradeep Venkatraman, et al., "A Novel ToA Location Algorithm Using LoS Range Estimation for NLoS Environments," IEEE Trans. Veh. Technol., vol. 53, No. 5, pp. 1515-1524, 2004.

Li Cong, "Nonline-of-Sight Error Mitigation in Mobile Location," IEEE Trans. Wireless Commun., vol. 4, No. 2, pp. 560-573, Mar. 2005.

"Richer RSTD reporting for indoor positioning", R1-163978 Ericsson, 3GPP TSG RAN WG1 Meeting #85, May 14, 2016.

Fig. 7

USER EQUIPMENT LOCALIZATION IN A MOBILE COMMUNICATION NETWORK BASED ON DELAYS AND PATH STRENGTHS

CROSS-REFERENCE TO RELATED APPLICATIONS

This application is a continuation of copending International Application No. PCT/EP2017/078870, filed Nov. 10, 2017, which is incorporated herein by reference in its entirety, and additionally claims priority from European Application No. EP 16 198 389.5, filed Nov. 11, 2016, which is incorporated herein by reference in its entirety.

The present invention concerns the field of wireless communication networks or systems, more specifically the localization of user equipment, like mobile terminals, in such a network. Examples describe a signal strength estimation for multiple time-difference measurements in the position determination or localization of a user equipment in the wireless communication network.

BACKGROUND OF THE INVENTION

Figure 1:
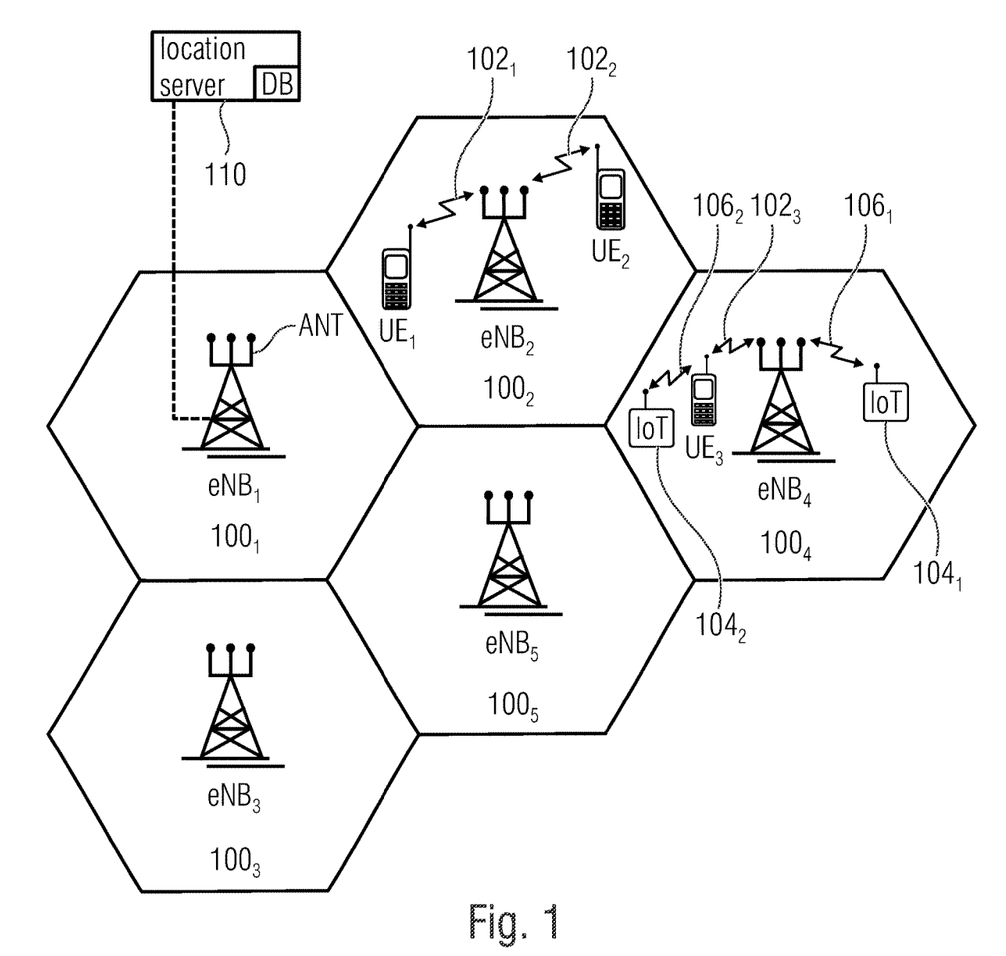
FIG. 1 shows a schematic representation of an example of a wireless communication system.

FIG. 1 is a schematic representation of an example of a network infrastructure, such as a wireless communication network or wireless communication system, including a plurality of base stations $eNB_1$ to eNBs, each serving a specific area surrounding the base station schematically represented by the respective cells $100_1$ to $100_5$. The base stations are provided to serve users within a cell. A user may be a stationary device or a mobile device. Further, the wireless communication system may be accessed by IoT devices which connect to a base station or to a user. IoT devices may include physical devices, vehicles, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell $100_2$ and that are served by base station $eNB_2$. Another user $UE_3$ is shown in cell $100_4$ which is served by base station $eNB_4$. The arrows $102_1$, $102_2$ and $102_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $104_1$ and $104_2$ in cell $100_4$, which may be stationary or mobile devices. The IoT device $104_1$ accesses the wireless communication system via the base station $eNB_4$ to receive and transmit data as schematically represented by arrow $106_1$. The IoT device $104_2$ accesses the wireless communication system via the user $UE_3$ as is schematically represented by arrow $106_2$.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filter-bank multicarrier (FBMC), may be used.

In a wireless communication network, like the one depicted in FIG. 1, it may be desired to locate a UE with a certain accuracy in a cell. One approach to locate a UE within a cell is based on an observed time difference of arrival (OTDOA) estimation that may be used in cellular communication networks, such as LTE, and which is a downlink positioning method that relies on the calculation of time of arrival (ToA) estimates using position reference signals (PRS) receives at the user equipment UE from one or more surrounding base stations (eNB), as is described, for example, in references [2] and [3]. PRS sequences are downlink signals that are designed for positioning purposes and that are broadcast to all radio terminals within a cell. The PRS sequences are radiated with the same transmit power from the antenna of the base station or the remote radio head (RRH) in all directions to cover all users at any location of the cell, i.e., to provide a cell-wide coverage. To distinguish the PRS sequences from different cells, each PRS sequence has associated therewith a cell-specific identifier also referred to as a physical cell identifier (PCI). The PCI is unique in a specific area and is used to identify the cell and thus the PRS sequence. At least three timing measurements from geometrically dispersed base stations may be used, relative to the UE's internal time base, in order to obtain a unique position in a plane. Four base stations are needed to obtain a unique position in a three-dimensional space as is described in reference [4].

Figure 2:
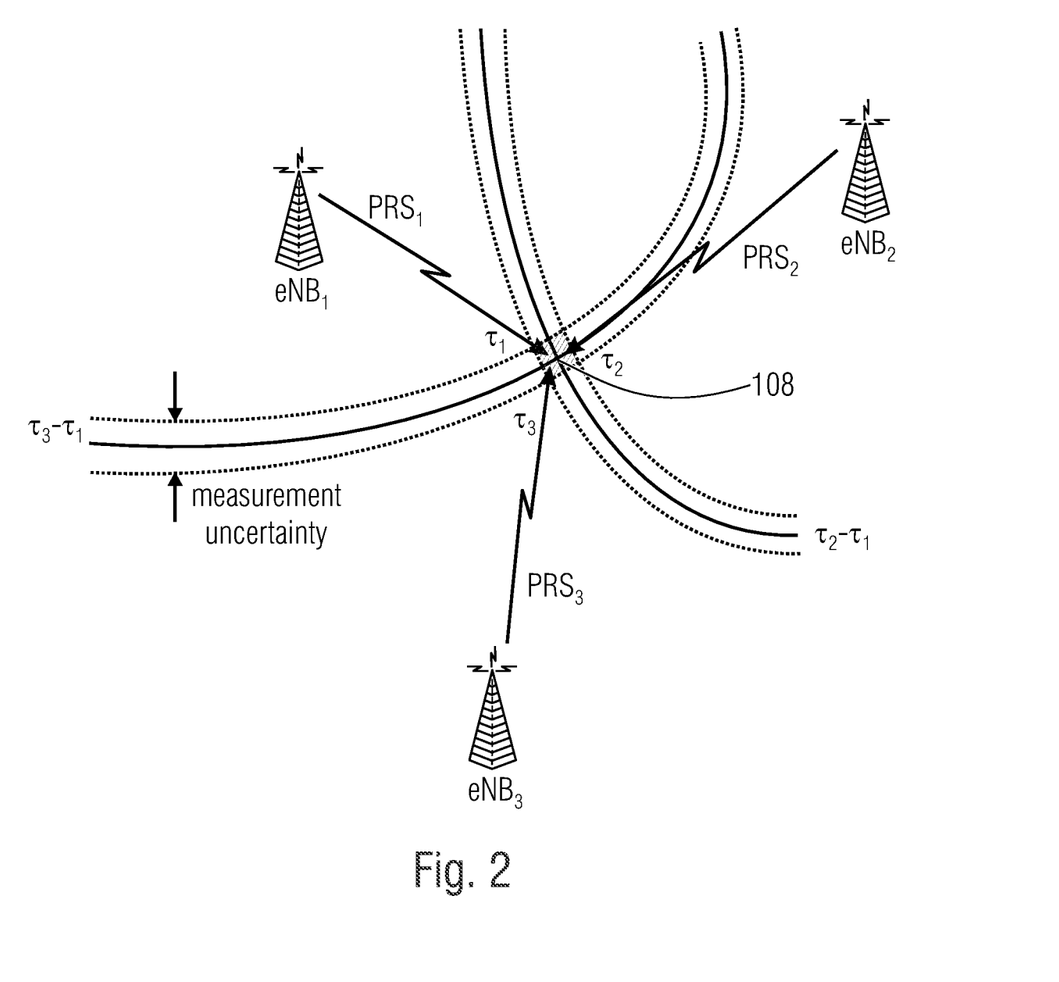
FIG. 2 is a schematic representation of a OTDOA measurement using three base stations.

FIG. 2 is a schematic representation of a OTDOA measurement using three base stations, wherein the figure is based on an image taken from reference [4]. The base stations $eNB_1$ to $eNB_3$ send out respective PRS sequences having associated therewith a PCI. Base station $eNB_1$ sends out the PRS sequence $PRS_1$, base station $eNB_2$ sends out the PRS sequence $PRS_2$, and base station $eNB_3$ sends out the PRS sequence $PRS_3$. The base stations $eNB_1$ to $eNB_3$ serve different cells of the wireless communication network. Although FIG. 2 shows a transmission of the respective PRS sequences in only one direction from each base station, as explained above, each base station transmits the sequences in all directions to cover all users at any location within the respective cell. In the example of FIG. 2, a user equipment is assumed to be at location 108. The UE at location 108 receives from the respective base stations the PRS sequences PRS1 to PRS3.

The UE at location 108 measures three ToAs $\tau_1$, $\tau_2$, $\tau_3$ relative to the UE internal time base. The base station $eNB_1$ is selected as a reference base station, and two OTDOAs are obtained by subtracting the ToA of the reference base station $eNB_1$ from the ToA measurements of the other base stations yielding as observed time differences of arrival the values $t_{2,1}=\tau_2-\tau_1$ and $t_{3,1}=\tau_3-\tau_1$, also referred to as relative signal timing differences (RSTDs). The relative signal timing differences are fed back to the base station serving the user equipment at location 108, as well as to a location server. The location server may be part of the base station or it may be an element separate from the base station, as is indicated at 110 in FIG. 1. The location server 110 may be part of the overall network structure and may be connected to each of the base stations shown in FIG. 1, although only one connection is shown in dotted lines in FIG. 1. The RSTD values are related to the geometric distances between the UE and the base stations and define hyperbolas around the respective locations of the base stations, as is indicated by line $\tau_3-\tau_1$ and line $\tau_2-\tau_1$ in FIG. 2. Based on the knowledge of the base station coordinates and the time offset between the UE and the reference base station $eNB_1$, the location server may determine the position of the UE. In FIG. 2, since each ToA measurement $\tau_i$ has a uncertain accuracy, the hyperbolas are shown with a width illustrating the measurement uncertainty. The estimated UE location is the intersection area of the two hyperbolas.

For the ToA measurements by the UE and the RSTD reporting, the first arriving signal path from each base station has to be accurately estimated. In pure line-of-side (LoS) channel conditions, the ToA estimates reflect the first detected LoS peaks in a cross-correlation of the received signal with a PRS sequence, which is known at the UE, so that the ToA directly corresponds to the distances between the UE and the base stations. This allows accurate position estimates for the UE. In multipath channel environments, however, the ToA estimates, and therefore also the RSTD measurements, may be biased by an obstruction of the LoS path or by the non-line-of-side (NLoS) signal path components of the channel and, in such a situation, the UE may not correctly detect the first arriving signal path which may lead to erroneous distance information.

Figure 3:
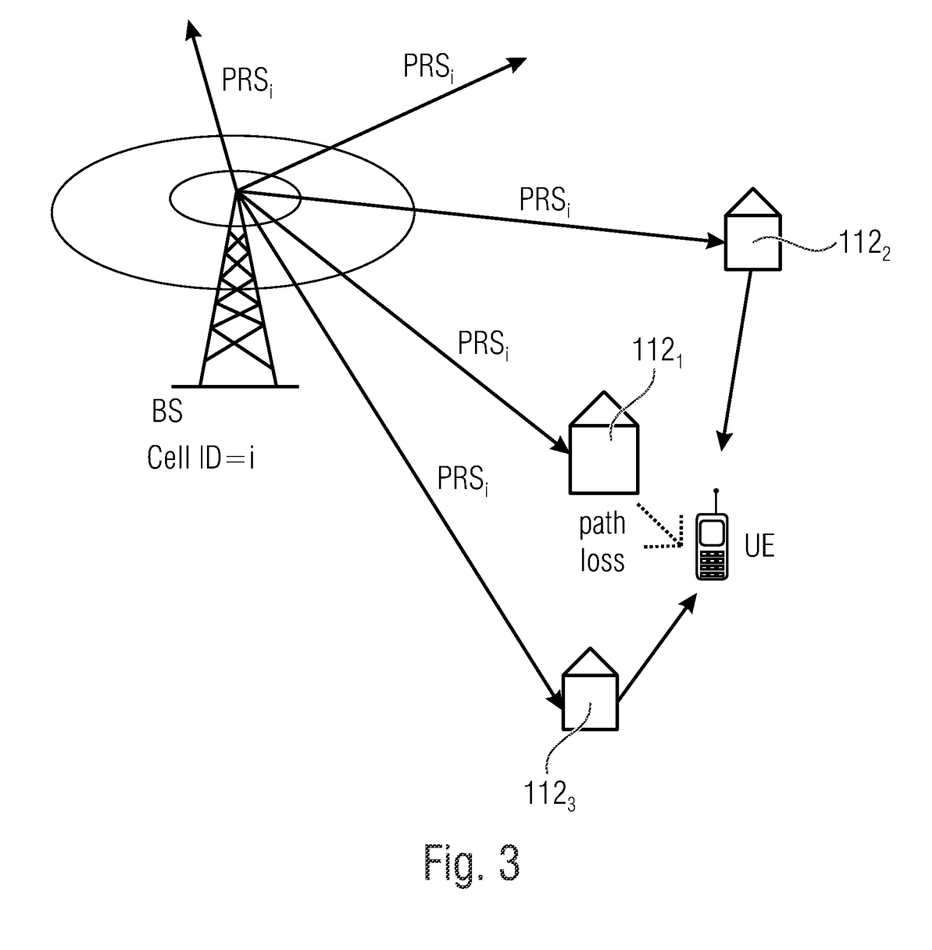
FIG. 3 represents a UE within a cell i that is served by a base station BS transmitting the same PRS sequence with the associated cell identifier in all directions.

The above described approach for localizing a UE within the cell uses PRS sequences that are transmitted by a plurality of base stations. Each base station sends out the same PRS sequence in all directions to cover all users. To allow for a localization at least three base stations are needed. Further, the radio propagation channel may suffer from a multipath propagation and shadowing or fading conditions so that the RSTD measurements may not be accurate. Multipath is a phenomenon that happens in the channel of mobile systems when the transmitted signal arrives at the receiver via different paths due to reflection, diffraction and scattering resulting in fading. This is schematically represented in FIG. 3 representing a UE within a cell i that is served by the base station BS transmitting the same PRS sequence with the associated cell identifier in all directions, namely the sequence $PRS_i$. The PRS sequence $PRS_i$ may not be directly received at the UE due to an obstacle $112_1$ scattering or shadowing the signal so that there is a path loss behind the obstacle $112_1$. The UE may receive the sequence $PRS_i$ due to a reflection of the signal at the obstacle $112_2$ and/or due to a diffraction at the obstacle $112_3$. In other words, there is only one transmitted signal $PRS_i$, however, the obstacles $112_1$ to $112_3$, like buildings, hills and trees, in the signal paths cause the signal to arrive at the UE from various directions with different delays. The multipath may be a source of error in the ToA estimation, for example, when there is no line of side path, even if the receiver UE detects the first arriving path.

To improve the position accuracy in multipath channel scenarios, a number of NLoS error mitigation techniques have been described for time-based location estimation, see for example references [6], [7], [8], [9], [10] and [11]. One NLoS error mitigation technique may assume that the NLoS corrupted ToA measurements are only a small portion of the total number of measurements, i.e., some of the links between the UE and the base station contain an LoS channel path. Another approach may detect NLoS corrupted ToA measurements due to their inconsistency with the expected measurement for a LoS scenario so that NLoS links between the UE and the base station may be identified and ignored for the localizing of the UE position as is, for example, described in references [8] and [12]. Yet other approaches may use all links between the UE and the base station and may introduce a weighting or scaling of ToA measurements to minimize the NLoS contributions, as is described in reference [13], or detect the NLoS errors and use the information to calculate all possible UE locations, as is described in reference [14].

As is shown in FIG. 1, the base stations of the wireless communication network include a plurality of antennas ANT, for example formed by an antenna array including a plurality of antenna elements, and the UE may also include more than one antenna. In scenarios in which both the UE and the base station are equipped with a plurality of antennas, location-independent parameters may be exploited in addition to the OTDOA measurements of the LoS or NLoS path components, for example an angle of arrival (AoA) at the UE and an angle of departure (AoD) at the base station may be used. Instead of detecting only NLoS errors and removing the influence of these errors, examples of localization techniques may benefit from the NLoS channel propagation by exploiting the geometrical relationship of possible UE locations implied by the NLoS path components. Such techniques are described, for example, in references [15] and [16] and rely on a parametric description of the multipath channel propagation environment, assuming knowledge of the path-dependent parameters AoD, AoA and the path distance d.

Figure 4:
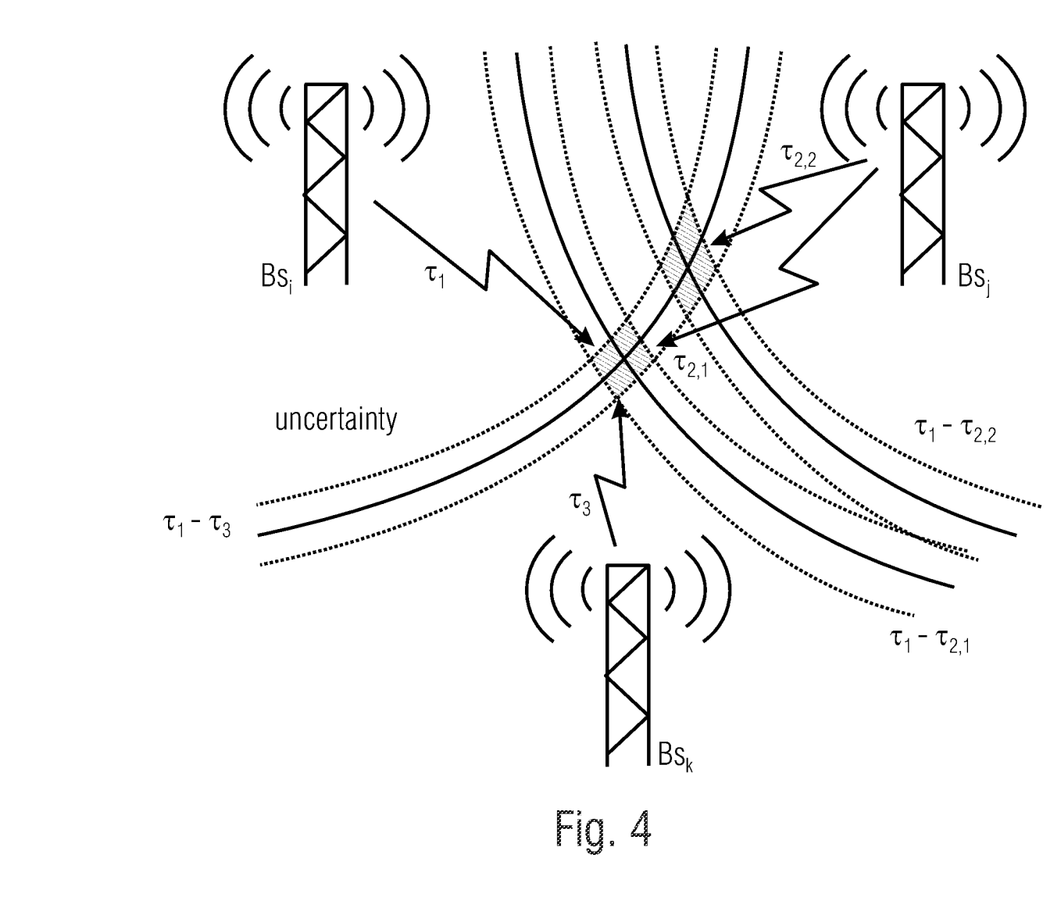
FIG. 4 is an example illustrating a multiple RSTD measurement approach.

To improve position accuracy in multipath channel scenarios, it has been proposed in reference [17] to extend the ToA measurement report sent by the UE to the serving base station by multiple RSTD measurements. Instead of sending only a single RSTD measurement report per UE-cell link, which corresponds to what the UE considers as the LOS peak in the cross-correlation function, more than one RSTD value is fed back to the base station. The multiple RSTD values, for example, correspond to multiple peaks of the PRS correlation function that represents the ToA estimates of the multipath components. The location server may perform the UE localization based on multiple RSTD hypotheses that may result in an improved positioning performance. This approach may also be applied in an interference scenario, e.g., in a situation in which an interference occurs due to strong correlations of PRS sequences sent from surrounding base stations. The multiple RSTD measurements in such a scenario may correspond to the peaks related to interfering signals. This may also be handled by multiple RSTD hypotheses at the location server. An example illustrating the multiple RSTD measurement approach is shown in FIG. 4, where for eNB1 and eNB3 there are two ToA estimates corresponding to the LOS path components of the channels, whereas for eNB2 there are two ToA estimates which are caused by a weak LOS component or an interfering signal, In this example, the RSTD values reported to the location server are given by $(\tau_1-\tau_2; \tau_1-\tau_3; \tau_1-\tau_{2,1}; \tau_1-\tau_{2,2})$ (see reference [17]). The multiple RSTD values for eNB2 are used to calculate multiple hypothesis of the UE position at the location server (see hatched area in FIG. 4). Considering the likelihood function of possible UE locations, it can be observed that the probability to estimate a more accurate UE position increases significantly with a multiple RSTD UE feedback compared to a single RSTD UE feedback (see reference [17]).

Figure 5A:
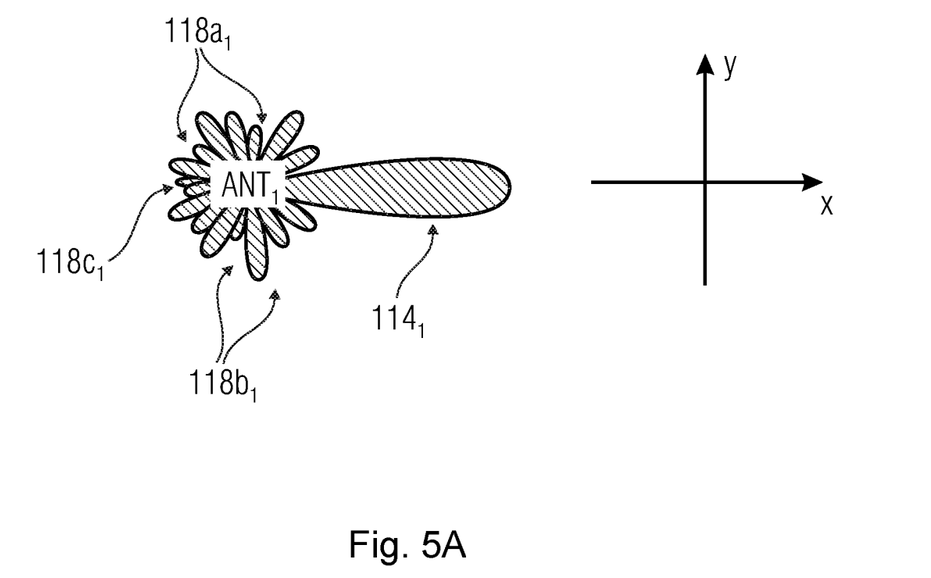
Figure 5B:
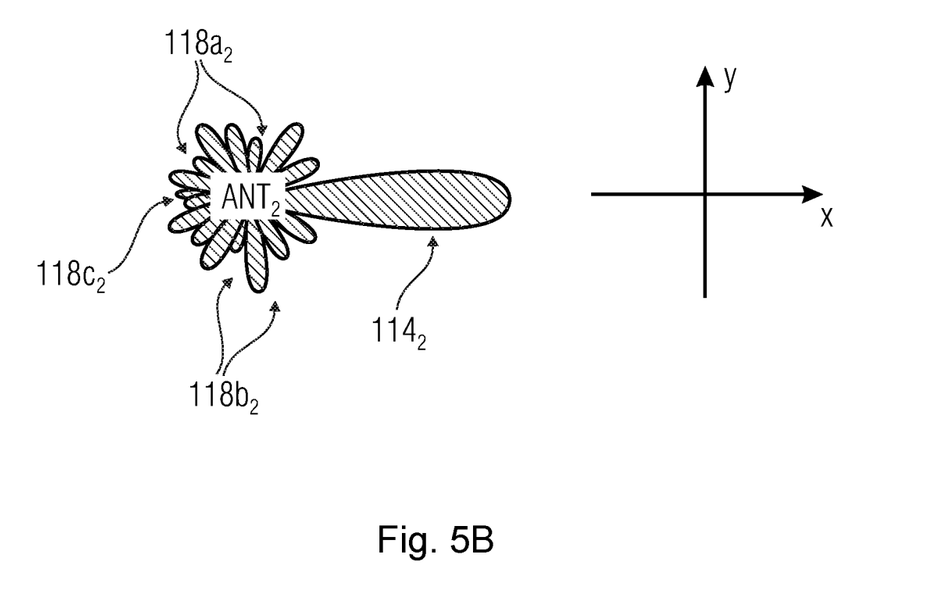
Figure 5C:
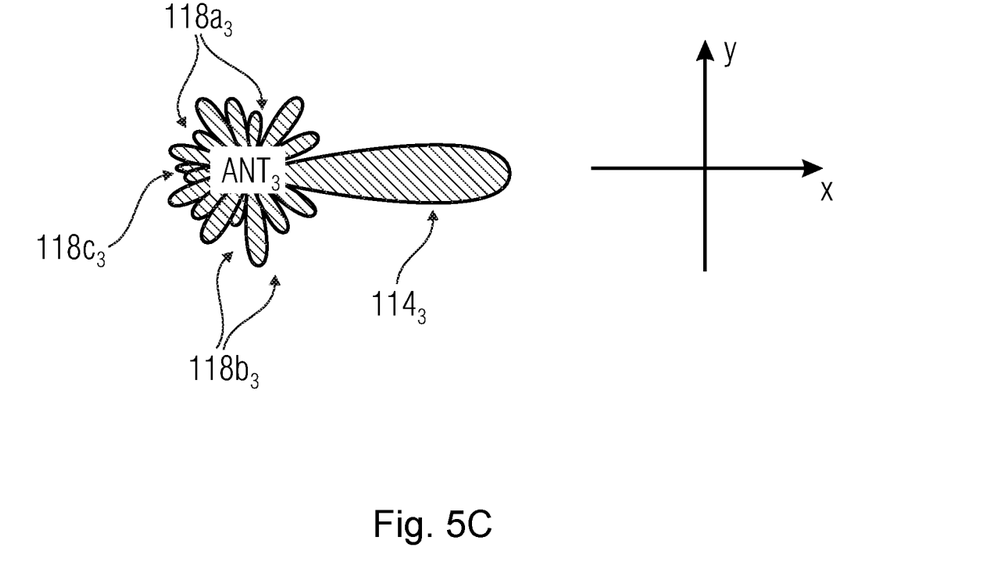

As mentioned above, the UE may be equipped with a plurality of antennas, for example, an antenna array, for transmitting or receiving radio signals. Each antenna has an antenna pattern describing a response of the antenna to a signal received at the antenna from a certain direction or angle. For example, the antenna pattern indicates that signals received at the antenna from a first direction are amplified, while signals received from a second direction are damped or suppressed. The respective antennas of the UE may have the same or different antenna patterns. FIGS. 5A-D shows examples for antenna patterns of different antennas of a UE and how LoS and NLoS path components in a multipath channel environment may be received at such an antenna. FIG. 5A shows an antenna pattern for a first antenna $ANT_1$ of the UE. The antenna $ANT_1$ has an antenna pattern including a main lobe $114_1$, and respective side lobes and nulls $118a_1$, $118b_1$ and $118c_1$. Signals received in a direction in which the main lobe $114_1$ are directed are received with an increased sensitivity, whereas signals received from a direction into which the respective side lobes and nulls $118a_1$, $118b_1$ $118c_1$ are directed are received with a reduced sensitivity. For example the signals received in the directions of the main lobe may be amplified, while those signals received from the direction of the side lobes may be damped or suppressed. FIG. 5B shows an antenna pattern for a second antenna $ANT_2$ of the UE. The second antenna $ANT_2$ has an antenna pattern or directivity including a main lobe $114_2$ and respective side lobes and nulls $118a_2$, $118b_2$ and $118c_2$. In the example of FIG. 5B the antenna pattern of the second antenna $ANT_2$ is the same as the antenna pattern of the first antenna $ANT_1$ shown in FIG. 5A. In the examples of FIG. 5A and FIG. 5B, the main lobes are oriented along the x-axis of the x/y plane at an angle of 0°. The side lobes are directed in directions between 0° to 360°. In accordance with other examples, the antenna pattern of the second antenna $ANT_2$ may be different from the antenna pattern of the first antenna $ANT_1$. FIG. 5C shows an example for such a different antenna pattern, which may be the antenna pattern for the second antenna $ANT_2$, or as is shown in this example is an antenna pattern for a third antenna $ANT_3$ of the UE. The antenna pattern or directivity of the third antenna $ANT_3$ also has a main lobe $114_3$, and respective side lobes and nulls $118a_3$, $118b_3$ and $118c_3$. In the example of FIG. 5C, the main lobe is oriented at an angle with respect to the x-axis of the x/y plane, and the side lobes are directed in different directions. When compared to the first and second antenna patterns, the respective lobes of the third antenna patterns are directed into different directions so that a signal received from a first direction, into which the main lobes $114_1$ and $114_2$ of first and second antennas are directed, receives a higher amplification by the first and second antennas than by the third antenna, or, in other words, is damped by the third antenna.

Figure 5D:
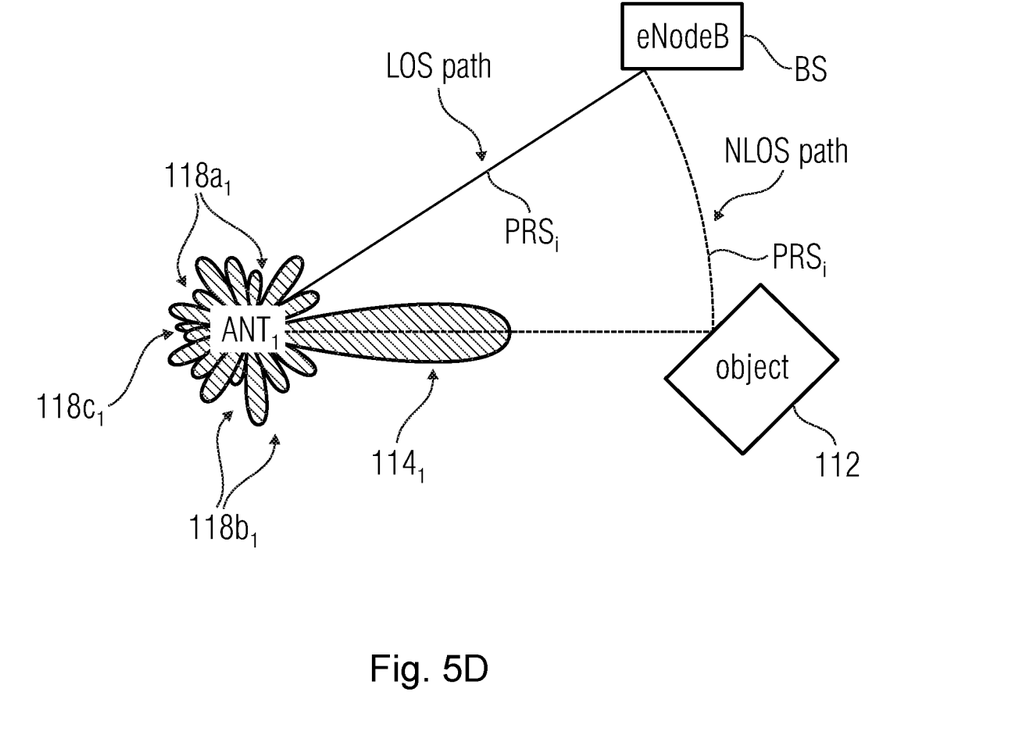

FIG. 5D shows how LoS and NLoS path components in a multipath channel environment may be received at an antenna of the UE, like the one shown in FIG. 5A. A base station BS transmits a signal carrying a PRS sequence $PRS_i$, and there is a direct path, the LOS path, between the base station BS and the UE as well as indirect paths, the NLOS paths, along which the signal $PRS_i$ is reflected at objects e.g. 112. The signal received via the LOS path is received from a direction to which one of the upper side lobes or null $118a_1$ of the antenna $ANT_1$ are directed, whereas the indirect or NLOS path component is received at the main lobe $114_1$. The signal on the LOS path experiences a damping or even a nulling by the antenna $ANT_1$ so that the UE may not correctly detect the first arriving signal path at the antenna $ANT_1$, which would be the LOS path, due the impact of the antenna pattern of the antenna $ANT_1$ which may suppress the signal strength of the LOS.

SUMMARY

An embodiment may have a receiver including a plurality of antennas, each antenna having an antenna pattern; wherein the receiver is configured to receive a plurality of radio signals from a plurality of transmitters of different cells of a wireless communication network, each radio signal including a position reference signal sequence, and each radio signal being transmitted to the receiver via a radio channel including a plurality of path components; wherein the receiver is configured to process the radio signal to estimate for a path component the time of arrival of the PRS sequence and to determine for a path component a path strength value of the PRS sequence; wherein a position of the receiver is estimated using the ToAs and the PS values, and wherein, on the basis of the antenna patterns, the receiver is configured to remove or eliminate from the determined PS values directional-dependent terms due to the specific antenna patterns, thereby providing PS values substantially free of any terms due to antenna characteristics of the receiver.

According to another embodiment, a wireless communication network may have: an inventive receiver and a plurality of transmitters.

According to another embodiment, a method may have the steps of: receiving, by a receiver having a plurality of antennas, a plurality of radio signals from a plurality of transmitters of different cells of a wireless communication network, each antenna having an antenna pattern, each radio signal including a position reference signal sequence, and each radio signal being transmitted to the receiver via a radio channel including a plurality of path components; processing the radio signal to estimate for a path component the time of arrival of the PRS sequence and to determine for a path component a path strength value of the PRS sequence; and estimating a position of the receiver using the ToAs and the PS values, wherein, on the basis of the antenna patterns, directional-dependent terms due to the specific antenna patterns are removed or eliminated from the determined PS values, thereby providing PS values substantially free of any terms due to antenna characteristics of the receiver.

Another embodiment may have a non-transitory digital storage medium having a computer program stored thereon to perform the method having the steps of: receiving, by a receiver having a plurality of antennas, a plurality of radio signals from a plurality of transmitters of different cells of a wireless communication network, each antenna having an antenna pattern, each radio signal including a position reference signal sequence, and each radio signal being transmitted to the receiver via a radio channel including a plurality of path components; processing the radio signal to estimate for a path component the time of arrival of the PRS sequence and to determine for a path component a path strength value of the PRS sequence; and estimating a position of the receiver using the ToAs and the PS values, wherein, on the basis of the antenna patterns, directional-dependent terms due to the specific antenna patterns are removed or eliminated from the determined PS values, thereby providing PS values substantially free of any terms due to antenna characteristics of the receiver, when said computer program is run by a computer.

BRIEF DESCRIPTION OF THE DRAWINGS

Embodiments of the present invention will be detailed subsequently referring to the appended drawings, in which:

FIGS. 5A-D shows in FIGS. 5A to 5C examples for antenna patterns of different antennas of a UE and in FIG.

5D how LoS and NLoS path components in a multipath channel environment may be received at such an antenna;

DETAILED DESCRIPTION OF THE INVENTION

In the following, embodiments of the present invention are described in further detail with reference to the enclosed drawings in which elements having the same or similar function are referenced by the same reference signs.

Figure 6:
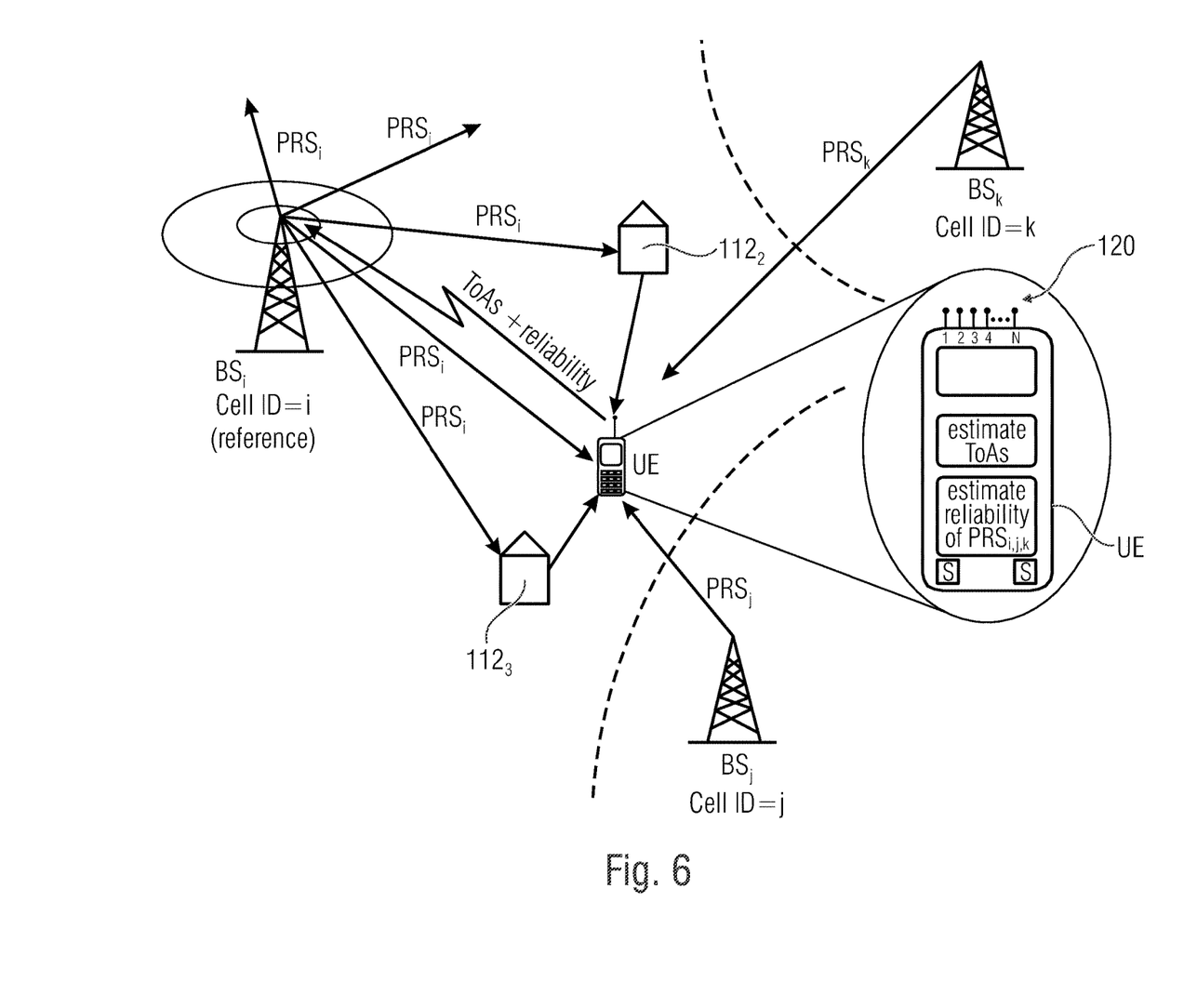
FIG. 6 shows an example of a wireless communication network operating for localizing a UE, in accordance with the inventive approach described herein.

FIG. 6 shows an example of a wireless communication network operating for localizing a UE, in accordance with the inventive approach described herein. More specifically, FIG. 6 shows a situation similar to the one of FIG. 3 except that the obstacle $112_1$ is not present so that a LOS path component from the base station $BS_i$ to the user equipment UE exists, and additional base stations of cells j and k are depicted, which send respective PRS sequences PRSj and PRSk that are received at the UE. The cell boundaries are indicated by the dashed lines. Further, FIG. 6 shows an enlarged view of the UE which includes a plurality of antennas 120, see antennas 1 ... N. The antennas may have respective antenna patterns as discussed above with reference to FIGS. 5A-D, so that LOS and NLOS path components related to the signals $PRS_i$, $PRS_i$ and $PRS_j$ that are received at the respective N antennas may be amplified by some of the antennas of the UE because the path components are received from a direction into which a main lobe of the antennas is directed, while the path components are attenuated or suppressed by other antennas of the UE as they are received from a direction into which the side lobes and nulls of the antennas are directed. In accordance with the inventive approach described herein, the UE, as is indicated in the enlarged view of FIG. 6, estimates the time of arrivals of the detected path components related to the PRS sequences sent from the respective base stations $BS_i$ to $BS_k$. The path strengths PS of the multiple individual path components are evaluated or estimated at the UE. The PS information may correspond to the path strength of a path component of the radio channel, or it may correspond to a level of an interfering signal. The UE may transmit the ToAs and PS values of the path components to the serving base station $BS_i$ which may be connected to the location server 110 shown in FIG. 1. The location server, on the basis of the received ToAs and the received PS values may estimate the position of the UE more accurately or precisely when compared to situations where it only operates on the basis of the ToAs.

Although the inventive approach has been described with reference to antennas having a specific antenna patterns including main and side lobes, such as those depicted in FIGS. 5A-D, it is noted that the present invention is not limited to such antenna patterns. The inventive approach may be used for any antenna patterns, including such antenna patterns which do not have any directivity, i.e., which do include a main lobe.

In accordance with examples, instead of the ToAs the UE may return the RSTD values which corresponds to the TDoAs of multiple path components. Furthermore, instead of the PS values the UE may return the relative path strength differences (RPSDs) using a path strength value of one of the transmitters as the reference.

The additional information about the path strength or the interference level may be exploited at the location server to improve the position estimate of the UE. For example, when the location server includes a tracking scheme using a combination of multiple pairs of RSTDs/ToAs and RPSDs/PSs, the LOS path component of the radio channel may be identified more precisely as compared to pure RSTD measurements as the LOS path component behaves rather deterministic in terms of changes of delay and path strength. As a consequence, the location estimates showing an increased variance may be classified as multipath observations and may be dropped or weighted to obtain a stable location estimate.

In accordance with other examples, the base station or the location server may request a set of strong RSTD and RPSD values only, for example the top-m values estimated by the UE, or a set of specific RSTD and RPSD pairs including each a delay and a path strength. Also, when considering a UE having a plurality of antennas 120, a feedback of RSTDs/ToAs and RPSDs/PSs from a specific set of antenna ports may be requested. For example, the feedback may be requested from a specific set of antenna ports when it is determined that one or more ports do not provide reliable or correct signals, e.g., when the signal level is below a threshold, which may be due to a port defect. In other examples, the feedback may be requested from a specific set of antenna ports when only a reduced processing power is to be used or available at the UE for determining the ToAs and PS values. Furthermore, when considering a UE with the ability of estimating the AoAs of the respective path components, a set of specific RSTD and RPSD pairs including a delay, an AoA and a path strength may be requested.

In accordance with further examples, the path strength or the interfering signal level may be obtained from the UE received signal power of the UE-cell link. A signal received at the UE from one of the antennas of the UE contains information about the multipath channel as received at this antenna, however, as mentioned above with reference to FIGS. 5A-D, the signal provided by the antenna to the UE also depends on the antenna pattern of the antenna, i.e., includes a signal portion that depends on the antenna pattern, also referred to as terms dependent on the receive antenna pattern. As mentioned each of the UE receive antennas 120 may have an antenna pattern so that the measured receive power from an individual channel path component depends on the receive direction of the path component at the antenna. For example, this may mean that an actually strong path will be attenuated and a weak path will get a higher gain. To address this, in accordance with examples of the inventive approach, the UE estimates the path strength or interference level of the detected channel path components by performing an antenna de-embedding. In other words, the UE is configured to reduce or remove any direction dependent terms from the path strength information which was obtained for a specific path component by the respective antennas of the UE. In accordance with examples, the UE obtains information, e.g. a dictionary, about the dependence of its antenna port outputs in amplitude and phase with respect to directions of arrival of the strongest, advantageously the LoS component of the channel. For example, the UE may rely on antenna steering vectors or on antenna switching & combining metrics, which are used to select subsets of the receive antenna elements. On the basis of the antenna patterns the UE removes or eliminates from the obtained path strengths the directional-dependent terms due to the specific antenna patterns, thereby providing a path strength value to the location server that is substantially free of any terms due to the UE antenna characteristics.

In accordance with examples, the UE orientation may be used for selecting antenna patterns to be used from the dictionary. Dependent on UE orientation antenna patterns for processing the received signal may be selected from the dictionary. For example, when the UE orientation indicates that the UE is held by a user in the hand and/or at the head, some antenna patterns may be disregarded for the processing because data obtained using such antenna patterns are considered less reliable. In accordance with other examples, the antenna de-embedding is performed only on the basis of those antenna patterns associated with the specific UE orientation. The UE may include one or more sensors S, the output or information signals of which form the basis for determining an orientation of the UE. A single information signal or a combination of information signals may be provided. For example, the information provided by a gyroscope sensor may be used to detect the absolute orientation of the UE in space, and the information provided by a camera or a light sensor may be used to detect a holding position of the UE. A dark image generated by the camera of the UE may indicate that the antenna is covered by an object, while a skin color may indicate that the UE is held in a hand or on-ear. Light colors may indicate that there is no blockage by an object. The orientation determination may be performed at the UE or the respective information from the sensors may be signaled to the base station for tracking the UE orientation at the base station or at the location server.

The UE antenna patterns may be described by the complex, three-dimensional antenna patterns, in accordance with examples also dependent on the polarization, describing the relative field strengths in terms of magnitude and phase of electromagnetic radio waves received at the antennas at different angles in free space. However, metallic mounting structures or other objects located in the vicinity of the UE antennas may lead to near-field distortions so that the effective antenna patterns of the UE antennas may be different from the antenna patterns measured in free space. In accordance with examples, a database may be provided to hold a dictionary or a map of a plurality of antenna patterns, described, e.g. by their respective antenna steering vectors. An array steering vector describes the antenna patterns of the UE dependent on the direction of an impinging wave at all antennas. The antenna patterns may depend on the use of the UE, e.g., the antenna patterns may be different when holding the UE in the hand or when objects block an antenna. The dictionary may be stored in the UE or in a database remote from the UE, e.g., at the location server. In accordance with examples, the UE may download the database, e.g., from the location server. A signal received at the UE may be related to the antenna patterns held in the dictionary which allows for the extraction of path strengths information of the different path components free of the specific UE antenna array radiation patterns. This "de-embedding" of the UE antenna patterns leads to a channel or path description free of the UE antenna patterns.

In accordance with examples to be described below, P pairs $(\hat{\tau}_p,\hat{\gamma}_p)$ or P triplets $(\hat{\tau}_p,\hat{\gamma}_p,\hat{\theta}_p)$ are sent from the UE to the location server, wherein p=1 . . . P, $\hat{\tau}_p$=delay, $\hat{\gamma}_p$=path strength, and $\hat{\theta}_p$=angle of arrival (AoA). The pairs/triplets are generated as an example on the basis of a correlation based approach or on the basis of a maximum-likelihood-based approach. On the basis of the received information, for example at the location server, multiple hypothesis tests may be performed using this information, e.g., the path strength information, to determine a UE location.

Correlation Based Approach

Considering an antenna array 120 (see FIG. 6) that radiates and receives along an azimuth dimension only, the array steering vector for a particular direction θ is defined as vector $b(\theta) \in \mathbb{C}^{N \times 1}$. The set Ω describes all possible array steering vectors, i.e., $\Omega = \{b(\theta) \forall \theta \in [0,2\pi)\}$. Initially, the received signal having embedded therein a specific PRS sequence, to determine the presence thereof, the signal is correlated with a signal generated at the receiver using the same PRS sequence so as to obtain the ToAs from the respective correlation peaks. Considering $r(\tau) \in \mathbb{C}^{N \times 1}$ to be the set of correlation values obtained at N antenna ports at the delay/ToA τ, the P triplets including, in accordance with this example, the angles of arrival (AoAs), the times of arrival (ToAs) and the path strengths, may be determined or obtained as follows:

1. A modified correlation function $$h(\theta, \tau) = \frac{b^H(\theta)r(\tau)}{\sqrt{b^H(\theta)b(\theta) + \lambda}}$$

is calculated. The term λ is a small constant to prevent the value of $h(\theta,\tau)$ from exploding due to an infinitesimally small antenna gain at certain angles.

2. The angles and delays corresponding to the P dominant peaks of $|h(\theta,\tau)|, (\hat{\theta}_p, \hat{\tau}_p)$, p=1, 2, . . . , P are determined.

3. The corresponding path strengths are calculated as $\hat{\gamma}_p = b(\hat{\theta}_p)^\dagger r(\hat{\tau}_p)$, p=1, 2, . . . , P, where the symbol † denotes a pseudo-inverse matrix.

4. P pairs $(\hat{\tau}_p,\hat{\gamma}_p)$ or P triplets $(\hat{\tau}_p,\hat{\gamma}_p,\hat{\theta}_p)$ are returned from the UE to the location server.

5. The location server may conduct multiple hypothesis tests to determine the UE location using, in addition to the delay information, also the path strengths information $\hat{\gamma}_p$.

In accordance with examples, as mentioned above, the UE orientation may also be returned to the location server, for example on the basis of respective signals from a gyroscope or from light sensors in the UE. Furthermore, in accordance with examples, the P delays $\hat{\tau}_p$ that are sent to the location server may directly represent the ToA values or they may be the RSTD values, with respect to a reference value, wherein the reference value is sent as the first value to the location server or is fed to the location server on demand. Furthermore, in accordance with examples, the P path strengths $\hat{\gamma}_p$ that are sent to the location server may directly represent the path strength values or they may be the RPSD values, with respect to a reference value, wherein the reference value is sent as the first value to the location server or is fed to the location server on demand.

In accordance with another example for the correlation based approach, the set of array steering vectors may have a fixed set of array responses, also referred to as an "array response dictionary" with little or no relationship to the angle of arrival, i.e., $\Omega = \{b_q, q=1, 2, \ldots, Q\}$. In such a situation, the P pairs including, in accordance with this example, the times of arrival (ToAs) and the path strengths, may be determined or obtained as follows:

1. The modified correlation function is determined as follows $$h(b_q, \tau) = \frac{b_q^H r(\tau)}{\sqrt{b_q^H b_q + \lambda}}$$

2. The array response vector indices and the delays corresponding to the P dominant peaks of $\sqrt[3]{h(b_q,\tau)}|$: $(\hat{q}_p, \hat{\tau}_p)$, p=1, 2, . . . , P are determined and the path strengths are determined as follows $\hat{\gamma}_p = b_{\hat{q}_p}^\dagger r(\hat{\tau}_p)$, p=1, 2, . . . , P.

Maximum-Likelihood-Based Approach

In accordance with other examples, the path strengths may be determined using a maximum likelihood estimation. No explicit correlation function is calculated when using a maximum likelihood estimation, rather, a model of the received signal is used to determine the ToAs and AoAs. As an example, an MIMO-OFDM system is assumed having M subcarriers and N antennas at the UE and one snapshot of the received vector, for example the received vector at a specific instance of delay/ToA $\tau$, may be expressed as follows:

$$x = H\gamma + n$$

The parameters in this equation are as follows:
$\gamma = [\gamma_1 \ \gamma_2 \ \ldots \ \gamma_P]^T$ are the path strengths.
$n \in \mathbb{C}^{MN \times 1}$ is the additive white Gaussian noise vector with $n \sim \mathcal{CN}(0_{MN \times 1}, \sigma_n^2 I_{MN})$.
$x \in \mathbb{C}^{MN \times 1}$ is the received vector having the following structure:

$$x = [x_{1,1} x_{1,2} x_{1,N} \ldots x_{M,1} x_{M,2} \ldots x_{M,N}]^T$$

with $x_{m,n}$ being the received symbol from the m-th subcarrier and the n-th antenna.
$H \in \mathbb{C}^{MN \times P}$ is the channel matrix having the following structure:

$$H = C(\tau) \odot B(\theta)$$

where
$C(\tau) = [c(\tau_1) \ c(\tau_2) \ \ldots \ c(\tau_P)] \in \mathbb{C}^{M \times P}$ with $c_m(\tau) = e^{-j2\pi(m-1)\Delta f \tau_p}$, m=1, . . . , M and
$B(\theta) = [b(\theta_1) \ b(\theta_2) \ \ldots \ b(\theta_P)] \in \mathbb{C}^{N \times P}$ is the array steering matrix.

In accordance with other examples, the channel matrix H may be represented as follows:

$$H = [c(\tau_1) \otimes b(\theta_1) c(\tau_2) \otimes b(\theta_2) \ldots c(\tau_P) \otimes b(\theta_P)]^T,$$

where the symbol $\otimes$ denotes the Kronecker product. The maximum likelihood solution for the path strengths, also referred to as path weights, and the corresponding AoAs and ToAs are determined as follows:

$$(\hat{\tau}, \hat{\theta}) = \arg \min_{(\tau, \theta)} tr\left(\mathcal{P}_H^\perp R_{xx}\right),$$

$$\hat{\gamma} = (H^H H)^{-1} H^H x,$$

where
$\mathcal{P}_H^\perp = I - H(H^H H)^{-1} H^H$ is the projection onto the noise subspace, and
$R_{xx} = x \cdot x^H$ is the correlation matrix of the received vector.

As mentioned above, the above solution is considering one snapshot of the received vector, however, it may be readily extended to multiple snapshots to improve the performance.

In a similar way as in the correlation based approach, also in the maximum-likelihood-based approach the array response dictionary may be used, namely a fixed set of array responses with little or no relationship with the angle of arrival. In this case, where there is little or no relationship between the steering vector and the angle of arrival, the estimation may be performed as follows:

$$(\hat{\tau}, \hat{b}_{q_1}, \hat{b}_{q_2}, \ldots, \hat{b}_{q_P}) = \arg \min_\tau tr\left(\mathcal{P}_H^\perp R_{xx}\right),$$

$$\hat{\gamma} = (H^H H)^{-1} H^H x,$$

where $H = [c(\tau_1) \otimes \hat{b}_{q_1} \ c(\tau_2) \otimes \hat{b}_{q_2} \ \ldots \ c(\tau_P) \otimes \hat{b}_{q_P}]^T$.

The examples described above are advantageous as for estimating a position of a UE, in addition to the delay information, also path strength information of the channel path components are determined at the UE side. The location server uses the RSTDs/ToAs together with the RPSDs/PSs values for multiple-hypotheses testing of the UE position, for example, described in reference [17] for RSTDs/ToA values only to improve the UE position estimate. Further, the path strength information may be used to distinguish between LOS and NLOS path components which allows to improve the position estimate.

Figure 7:
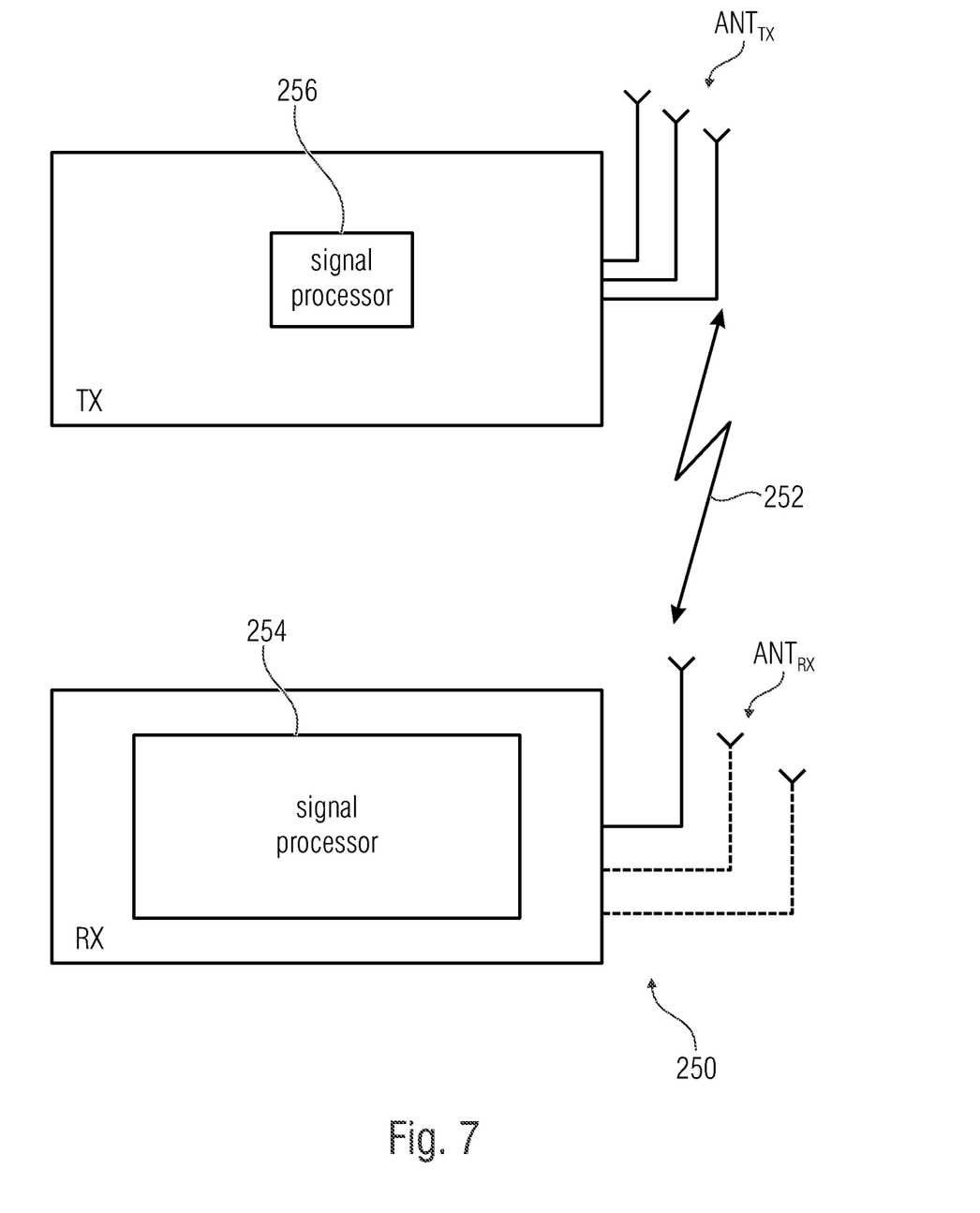
FIG. 7 is a schematic representation of a wireless communication system for transmitting information from a transmitter to a receiver.

Embodiments of the present invention may be implemented in a wireless communication system as depicted in FIG. 1 including base stations, users, like mobile terminals or IoT devices. FIG. 7 is a schematic representation of a wireless communication system 250 for communicating information between a transmitter TX and a receiver RX. Both, the transmitter TX and the receiver RX include a plurality of antennas $ANT_{TX}$, $ANT_{RX}$ or an antenna array having a plurality of antenna elements. As is indicated by the arrow 252 signals are communicated between the transmitter TX and the receiver RX via a wireless communication link, like a radio link. The transmission may be in accordance with the one of the techniques described above with reference to FIG. 1

The signaling between the transmitter TX and RX is in accordance with the above described embodiments of the present invention. For example, the receiver RX receives via the antennas $ANT_{RX}$ a plurality of radio signals from a plurality of transmitters of different cells of a wireless communication network and applies the signals to a signal processor 254. Each radio signal includes a position reference signal (PRS) sequence. The receiver RX processes the radio signals to estimate time of arrivals (ToA) of each PRS sequence and to determine a path strength of each received radio signal with respect to the different ToAs. A position of the receiver is estimated using the times of arrival and the determined path strengths. The position may be estimated at the receiver RX, at the transmitter or at a location server of the wireless communication network. In the latter cases, the ToAs and PS values may be communicated to the transmitter/location server via the radio link 252. The transmitter TX comprises a signal processor 256 to generate a signal to be transmitted to the receiver RX. The transmitter TX may transmit a radio signal having a position reference signal (PRS) sequence via one or more antennas $ANT_{TX}$.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Depending on certain implementation requirements, embodiments of the invention may be implemented in hardware or in software. The implementation may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP, "Study on indoor positioning enhancements for UTRA and LTE", 3rd Generation Partnership Project, December 2015
[2] 3GPP, "LTE Positioning Protocol (LPP) (Release 13)", 3rd Generation Partnership Project, March 2016
[3] 3GPP, "LTE Positioning Protocol A (LPPa) (Release 13)", 3rd Generation Partnership Project, March 2016
[4] S. Fischer, "Observed Time Difference Of Arrival (OT-DOA) positioning in 3GPP LTE", Qualcomm White Pap, vol. 1, pp. 1-62, June 2014
[5] M. Thorpe and E. Zelmer, "LTE Location Based Services Technology Introduction", Rhode & Schwarz, September 2015
[6] M. P. Wylie and S. Wang, "Robust range estimation in the presence of the non-line-of-sight error," in Proc. IEEE Vehicular Technology Conference, vol. 1, pp. 101-105, Fall 2001.
[7] S. Venkatraman, J. Caffery, and H.-R. You, "Location using LOS range estimation in NLOS environments," in Proc. IEEE Vehicular Technology Conference, vol. 2, pp. 856-860, Spring 2002.
[8] L. Xiong, "A selective model to suppress NLOS signals in angle-of-arrival AOA location estimation," in Proc. IEEE Int. Symp. Pers., Indoor, Mobile Radio Commun., Boston, Mass., Sep. 8-11, 1998, vol. 1, pp. 461-465.
[9] P. Chen, "A nonline-of-sight error mitigation algorithm in location estimation," in Proc. IEEE Wireless Commun. Netw. Conf., New Orleans, La., Sep. 21-24, 1999, vol. 1, pp. 316-320.
[10] L. Cong and W. Zhuang, "Non-line-of-sight error mitigation in TDOA mobile location," in Proc. IEEE Global Telecommun. Conf., San Antonio, Tex., Nov. 25-29, 2001, vol. 1, pp. 680-684.
[11] S. Al-Jazzar, J. Caffery, and H. You, "A scattering model based approach to NLOS mitigation in TOA location systems," in Proc. IEEE Veh. Technol. Conf., Birmingham, Ala., May 6-9, 2002, vol. 2, pp. 861-865.
[12] Y. Chan, W. Y Tsui, H. C. So, P. Ching, "Time-of-arrival based localization under NLOS conditions," IEEE Transactions on Vehicular Technology, January 2006, vol. 55, pp. 17-24.
[13] S. Venkatraman, J. J. Caffery, and H.-R. You, "A novel ToA location algorithm using los range estimation for NLOS environments," IEEE Trans. Veh. Technol., vol. 53, no. 5, pp. 1515-1524, 2004.
[14] L. Cong and W. Zhuang, "Nonline-of-sight error mitigation in mobile location," IEEE Trans. Wireless Commun., vol. 4, no. 2, pp. 560-573, March 2005.
[15] H. Miao, K. Yu, and M. J. Juntti, "Positioning for NLOS propagation: Algorithm derivations and Cramer-Rao bounds," IEEE Trans. Veh. Technol., vol. 56, no. 5, pp. 2568-2580, 2007.
[16] K. Papakonstantinou, D. Slock, "NLOS Mobile Terminal position and speed estimation," Communications, Control and Signal Processing, 2008. ISCCSP 2008. 3rd International Symp., pp. 1308-1313, March 2008.
[17] R1-163978 Richer RSTD reporting for indoor positioning, Ericsson, 2016 May 14

The invention claimed is:
1. A mobile terminal, comprising:
  a plurality of antennas, each antenna comprising an antenna pattern that includes a main lobe and a plurality of side lobes, the antenna pattern describing a response of the antenna to a signal received at the antenna;

wherein the mobile terminal is configured to receive, at the plurality of antennas, a plurality of radio signals from a plurality of transmitters of different cells of a wireless communication network, each radio signal comprising a position reference signal (PRS) sequence, and wherein each radio signal is transmitted to the mobile terminal via a radio channel comprising a plurality of path components;

wherein the mobile terminal is configured to process at least one of the plurality of radio signals to estimate, for at least one of the plurality of path components, a time of arrival (ToA) of the PRS sequence and to determine, for the at least one path component, a path strength (PS) value of the PRS sequence to enable an estimation of a position of the mobile terminal; and wherein the ToA and the PS value of the PRS sequence are determined based on:

determining a vector of correlation values that is dependent on a delay based on a correlation of the plurality of radio signals received at the plurality of antennas and a signal generated at the mobile terminal using the PRS sequence, determining values for a correlation function based on the vector of correlation values and antenna steering vectors representing responses of the plurality of antennas, determining, based on the correlation function, P strongest peaks of the plurality of radio signals, P being a positive integer, determining, based on the P strongest peaks, the ToA of the PRS sequence, and determining, based on the P strongest peaks, a corrected PS value as the PS value to reduce or eliminate an amplification or a suppression of a PS value caused by directions of the main lobe and the plurality of side lobes of each antenna pattern to reduce an impact of antenna characteristics of the mobile terminal.

2. The mobile terminal of claim 1, wherein the mobile terminal is configured to determine PS values for a certain number of path components of the radio channel or for all path components of the radio channel.

3. The mobile terminal of claim 1, wherein the mobile terminal is configured to transmit the ToA and the PS value to a location server that is configured to estimate the position of the mobile terminal.

4. The mobile terminal of claim 1, wherein the mobile terminal is configured to determine, based on the P strongest peaks, angles of arrival of the plurality of radio signals.

5. The mobile terminal of claim 1, wherein the mobile terminal is configured to determine angles of arrival, ToAs, and corrected PS values of the plurality of path components based on a high resolution parameter estimation approach using the received plurality of signals and antenna steering vectors representing responses of the antennas.

6. The mobile terminal of claim 1, wherein the antenna steering vectors are stored in a dictionary of steering vectors, the dictionary of steering vectors comprising a set of antenna steering vectors representing the responses of the plurality of antennas that are dependent on an angle of arrival direction, or a fixed, unique set of antenna steering vectors representing the responses of the plurality of antennas that are independent of an angle of arrival direction.

7. The mobile terminal of claim 6, wherein the steering vectors are selected from the dictionary based on an orientation of the receiver.

8. The mobile terminal of claim 6, wherein the dictionary of steering vectors is stored in a database, and the mobile terminal is configured to access the database or to download the database.

9. The mobile terminal of claim 1, configured to acquire relative signal timing differences (RSTDs) using a ToA of one of the transmitters as a reference ToA, wherein the RSTDs are transmitted to enable the estimation of the position of the mobile terminal.

10. The mobile terminal of claim 1, wherein the mobile terminal is configured to acquire relative path strength differences (RPSDs) using a path strength value of one of the transmitters as a reference, wherein the RPSDs are transmitted to enable the estimation of the position of the mobile terminal.

11. The mobile terminal of claim 1, wherein each PRS sequence is associated therewith a cell identifier, and wherein the mobile terminal is configured to further acquire, for each PRS sequence, the associated cell identifier to enable the estimation of the position of the receiver.

12. The mobile terminal of claim 1, comprising one or more sensors, wherein the mobile terminal is configured to calculate an orientation of the mobile terminal using data from the one or more sensors, and to transmit the orientation to a location server.

13. The mobile terminal of claim 1, wherein the path strength value corresponds to an interference level of a signal interfering with the transmitted radio signal of a cell.

14. The mobile terminal of claim 1, wherein the plurality of path components of the radio channel comprises a line-of-sight path component and/or a non-line-of-sight path component.

15. A wireless communication network, comprising:
a mobile terminal as claimed in claim 1; and
the plurality of transmitters.

16. The wireless communication network of claim 15, comprising a location server configured to estimate the position of the mobile terminal.

17. The wireless communication network of claim 15, wherein at least one transmitter of the plurality of transmitters is a base station, and wherein the wireless communication network uses an IFFT based signal.

18. The wireless communication network of claim 17, wherein the IFFT based signal comprises OFDM with CP, DFT-s-OFDM with CP, IFFT-based waveforms without CP, f-OFDM, FBMC or UFMC.

19. The wireless communication network of claim 18, wherein OFDM with CP is used for a downlink transmission, and DFT-s-OFDM with CP or a single tone transmission is used for an uplink transmission.

20. A method, comprising:
receiving, by a mobile terminal comprising a plurality of antennas, a plurality of radio signals from a plurality of transmitters of different cells of a wireless communication network, each antenna comprising an antenna pattern that includes a main lobe and a plurality of side lobes, the antenna pattern describing a response of the antenna to a signal received at the antenna, each radio signal comprising a position reference signal (PRS) sequence, and each radio signal being transmitted to the mobile terminal via a radio channel comprising a plurality of path components; and
processing at least one of the plurality of radio signals to estimate, for at least one of the plurality of path components a time of arrival (ToA) of the PRS sequence and to determine, for at least one path component, a path strength (PS) value of the PRS sequence wherein the ToA and the PS value of the PRS sequences are determined based on:
determining a vector of correlation values that is dependent on a delay based on a correlation of the plurality of radio signals received at the plurality of antennas and a signal generated at the mobile terminal using the PRS sequence,
determining values for a correlation function based on the vector of correlation values and antenna steering vectors representing responses of the plurality of antennas,
determining, based on the correlation function, P strongest peaks of the plurality of radio signals, P being a positive integer,
determining, based on the P strongest peaks, the ToA of the PRS sequence, and
determining, based on the P strongest peaks, a corrected PS value as the PS value to reduce or eliminate an amplification or a suppression of a PS value caused by directions of the main lobe and the plurality of side lobes of each antenna pattern to reduce an impact of antenna characteristics of the mobile terminal.

21. A non-transitory digital storage medium having a computer program stored thereon, the code, when executed by a processor, causing the processor to perform the method comprising:
receiving, by a mobile terminal comprising a plurality of antennas, a plurality of radio signals from a plurality of transmitters of different cells of a wireless communication network, each antenna comprising an antenna pattern that includes a main lobe and a plurality of side lobes, the antenna pattern describing a response of the antenna to a signal received at the antenna, each radio signal comprising a position reference signal (PRS) sequence, and each radio signal being transmitted to the mobile terminal via a radio channel comprising a plurality of path components; and
processing at least one of the plurality of radio signals to estimate, for at least one of the plurality path components, a time of arrival (ToA) of the PRS sequence and to determine, for at least one path component, a path strength (PS) value of the PRS sequence,
wherein the ToA and the PS value of the PRS sequence are determined based on:
determining a vector of correlation values that is dependent on a delay based on a correlation of the plurality of radio signals received at the plurality of antennas and a signal generated at the mobile terminal using the PRS sequence,
determining values for a correlation function based on the vector of correlation values and antenna steering vectors representing responses of the plurality of antennas,
determining, based on the correlation function, P strongest peaks of the plurality of radio signals, P being a positive integer,
determining, based on the P strongest peaks, the ToA of the PRS sequence, and
determining, based on the P strongest peaks, a corrected PS value as the PS value to reduce or eliminate an amplification or a suppression of a PS value caused by directions of the main lobe and the plurality of side lobes of each antenna pattern to reduce an impact of antenna characteristics of the mobile terminal.

* * * * *